United States Patent
Bharatia et al.

(10) Patent No.: US 11,116,016 B2
(45) Date of Patent: Sep. 7, 2021

(54) RESOURCE ASSIGNMENT FOR GENERAL PACKET RADIO SERVICE TUNNELING PROTOCOL (GTP) ENTITIES IN 5G

(71) Applicant: Samsung Electronics Co., Ltd, Suwon-si (KR)

(72) Inventors: Jayshree A. Bharatia, Plano, TX (US); Sung Hwan Won, Seoul (KR); Sunghoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/398,649

(22) Filed: Jan. 4, 2017

(65) Prior Publication Data

US 2017/0208634 A1   Jul. 20, 2017

Related U.S. Application Data

(60) Provisional application No. 62/279,941, filed on Jan. 18, 2016, provisional application No. 62/317,971, filed on Apr. 4, 2016.

(51) Int. Cl.
*H04W 76/11* (2018.01)
*H04W 72/04* (2009.01)
(Continued)

(52) U.S. Cl.
CPC ........ *H04W 76/11* (2018.02); *H04W 72/0406* (2013.01); *H04W 80/04* (2013.01); *H04W 84/042* (2013.01); *H04W 88/16* (2013.01)

(58) Field of Classification Search
CPC . H04W 76/11; H04W 72/0406; H04W 80/04; H04W 84/042; H04W 88/16
See application file for complete search history.

(56) References Cited

U.S. PATENT DOCUMENTS

| 2015/0117408 A1* | 4/2015 | Kedalagudde .... H04W 36/0027 370/331 |
| 2016/0006606 A1 | 1/2016 | Zhu et al. |

(Continued)

FOREIGN PATENT DOCUMENTS

| CN | 103476017 A | 12/2013 |
| CN | 104255046 A | 12/2014 |
| CN | 104519523 A | 4/2015 |

OTHER PUBLICATIONS

3GPP TR23.714 Study on control and user plane separation of EPC nodes (Release 14) Jun. 2016 (Year: 2016).*

(Continued)

*Primary Examiner* — Jeffrey M Rutkowski
*Assistant Examiner* — Basil Ma

(57) ABSTRACT

A wireless cellular network system comprising MME configured to send a first create session request to SGW-C, the SGW-C configured to select SGW-U and transmit a first resource request to the selected SGW-U, and the SGW-U configured to, upon a receipt of the first resource request, allocate an IP address and TEIDs of the SGW-U, and transmit a resource message including the IP address and the TEIDs of the SGW-U to SGW-C. A method of SGW-C in a wireless communication system, the method comprising receiving, from MME, a first create session request, selecting SGW-U among a plurality of SGW-Us, wherein the selection is based on a location of a terminal, transmitting a first resource request to the selected SGW-U, receiving, from the selected SGW-U, a resource message including an IP address and TEID of the SGW-U, the IP address and TEIDs being allocated by the selected SGW-U.

15 Claims, 5 Drawing Sheets

(51) Int. Cl.
*H04W 80/04* (2009.01)
*H04W 84/04* (2009.01)
*H04W 88/16* (2009.01)

(56) References Cited

U.S. PATENT DOCUMENTS

| | | | |
|---|---|---|---|
| 2017/0126618 A1* | 5/2017 | Bhaskaran | H04L 61/2015 |
| 2017/0251514 A1* | 8/2017 | Soderlund | H04L 61/2007 |
| 2018/0007536 A1* | 1/2018 | Xu | H04W 36/0016 |
| 2018/0295659 A1* | 10/2018 | Shan | H04L 12/1407 |
| 2018/0302857 A1* | 10/2018 | Shan | H04W 68/005 |
| 2019/0007984 A1* | 1/2019 | Kuroda | H04W 88/16 |
| 2020/0296633 A1* | 9/2020 | Michalopoulos | H04W 36/023 |

OTHER PUBLICATIONS

3GPP TR 23.714 V0.2.0 (Nov. 2015) 3rd Generation Partnership Project; Technical Specification Group Services and System Aspects; Study on control and user plane separation of EPC nodes (Release 14)—24 Pages.

3GPP TS 23.401 V13.5.0 (Dec. 2015) 3rd Generation Partnership Project; Technical Specification Group Services and System Aspects; General Packet Radio Service (GPRS) enhancements for Evolved Universal Terrestrial Radio Access Network (E-UTRAN) access (Release 13) 337 Pages.

ZTE et al., "Solution to maintain existing TAI list allocation support", SA WG2 Meeting #112, Nov. 16-20, 2015, 2 pages, S2-153902.

NEC, "Solution to Key Issues 4: Relocation of UP functional based on the UE topological location", SA WG2 Meeting #113, Jan. 25-29, 2016, 3 pages, S2-160247.

Ericsson, "Functional split", SA WG2 Meeting #112, Nov. 16-20, 2015, 6 pages, S2-153863.

Ericsson, "TAI List problem and User plane area mapping", SA WG2 Meeting #113, Jan. 25-29, 2016, S2-160148.

Supplementary European Search Report dated Dec. 6, 2018 in connection with European Patent Application No. 17 74 1659, 9 pages.

First Office Action dated Feb. 2, 2021 in connection with Chinese Application No. 201780006994.X, 19 pages.

Notice of Reasons for Refusal dated Jan. 18, 2021 in connection with Japanese Application No. 2018-532437, 10 pages.

Ericsson, "TAI List problem and User plane area mapping," S2-160858 (revision of S2-160774), SA WG2 Temporary Document, SA WG2 Meeting #113, Saint Kitts, KN, Jan. 25-29, 2016, 7 pages.

ZTE, "Solution to key issue 3: SGW-C initiated SGW-U relocation," S2-154022 (revision of 52-15xxxx), SA WG2 Meeting #112, USA, Nov. 16-20, 2015, 2 pages.

* cited by examiner

RESOURCE ASSIGNMENT FOR GENERAL PACKET RADIO SERVICE TUNNELING PROTOCOL (GTP) ENTITIES IN 5G

CROSS-REFERENCE TO RELATED APPLICATIONS AND CLAIM OF PRIORITY

This application claims priority under 35 U.S.C. § 119(e) to U.S. Provisional Patent Application No. 62/279,941 filed Jan. 18, 2016 entitled RESOURCE ASSIGNMENT FOR GTP ENTITIES IN 5G; U.S. Provisional Patent Application No. 62/317,971 filed Apr. 4, 2016 entitled RELOCATION OF THE USER PLANE FUNCTION OF SGW DUE TO MOBILITY EVENT. The above-identified provisional patent application is hereby incorporated by reference in its entirety.

TECHNICAL FIELD

This disclosure relates generally to the wireless cellular network. More specifically, this disclosure relates to the resource assignment for General Packet Radio Service (GPRS) Tunneling Protocol (GTP) entities in the wireless cellular network.

BACKGROUND

A Long Term Evolution (LTE) system includes an access network and a core network. The access network includes an eNodeB connected to the user equipments or Machine Type Communication (MTC) devices, and the core network consists of a plurality of network entities, such as a Mobility Management Entity (MME), a serving gateway, and a Packet Data Network (PDN) gateway (PGW).

SUMMARY

The present disclosure relates to a pre-5$^{th}$-Generation (5G) or 5G communication system to be provided for supporting higher data rates Beyond 4$^{th}$-Generation (4G) communication system such as Long Term Evolution (LTE).

The present disclosure provides a solution for IP address assignment of SGW and PGW and also tunnel endpoint identifiers (TEIDs) for GTP user plane and control plane.

In a first embodiment, a wireless cellular network system comprising a Mobility Management Entity (MME) configured to send a first create session request to a serving-gateway control-plane function (SGW-C), the SGW-C configured to, upon a receipt of the first create session request, select a serving-gateway user-plane function (SGW-U) among a plurality of SGW-Us, and transmit a first resource request to the selected SGW-U, and the SGW-U configured to, upon a receipt of the first resource request, allocate an internet protocol (IP) address and tunnel endpoint identifiers (TEIDs) of the SGW-U, and transmit a resource message including the IP address and the TEIDs of the SGW-U to SGW-C.

In a second embodiment, a method of a serving gateway-control plane function (SGW-C) in a wireless communication system, the method comprising receiving, from a Mobility Management Entity (MME), a first create session request, selecting a serving-gateway user plane function (SGW-U) among a plurality of SGW-Us, wherein the selection is based on a location of a terminal, transmitting a first resource request to the selected SGW-U, receiving, from the selected SGW-U, a resource message including an IP address and tunnel endpoint identifiers (TEID) of the SGW-U, the IP address and TEIDs being allocated by the selected SGW-U.

In a third embodiment, a serving gateway-control plane function (SGW-C) includes a transceiver configured to receive a first create session request from a Mobility Management Entity (MME), and a controller configured to select a serving-gateway user plane function (SGW-U) among a plurality of SGW-Us, wherein the selection is based on a location of a user equipment (UE), cause the transceiver to transmit a first resource request to the selected SGW-U, cause the transceiver to receive, from the selected SGW-U, a resource message including an IP address and tunnel endpoint identifiers (TEID) of the previously selected SGW-U, the IP address and TEIDs being allocated by the selected SGW-U.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
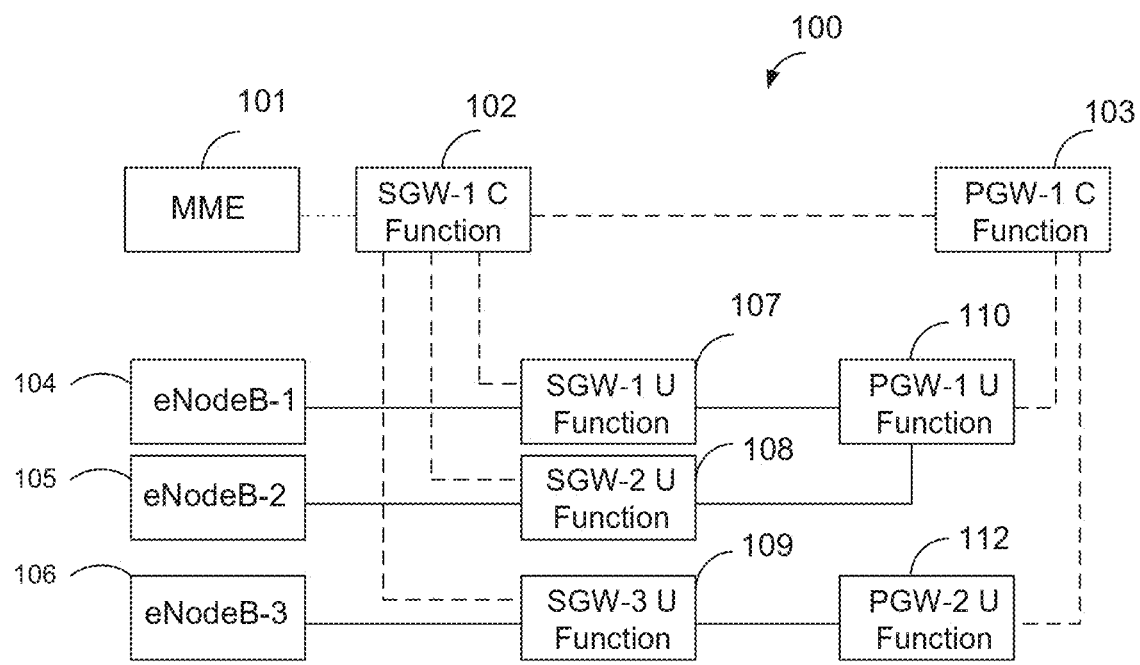
FIGS. 1A and 1B illustrate an architecture of a wireless cellular network according to this present disclosure.

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The following documents and standards descriptions are hereby incorporated by reference into the present disclosure as if fully set forth herein: 3GPP TR 23.401 v.13.8.0, "General Packet Radio Service (GPRS) enhancements for Evolved Universal Terrestrial Radio Access Network (E-UTRAN) access E-UTRA, Physical channels and modulation"; 3GPP TR 23.714 v.14.0.0, "Control and User Plane Separation of EPC nodes".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

A legacy cellular network includes GTP entities such as Serving Gateway (SGW) in the visited network and Packet Data Network Gateway (PDN Gateway or PGW) in the home or visited network based on the type of session requested. As a part of evolution toward 5G network, there is an initiative in 3GPP SA2 standards to split control plane and user plane of these GTP entities. The present disclosure provides a method and system for assigning IP address and Tunnel Endpoint Identifiers (TEIDs) allocations for GTP user plane and control plane of these GTP entities.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1A illustrates an architecture of a wireless cellular network 100 in accordance with this present disclosure. The cellular network 100 includes cellular networks includes GTP entities such as Serving Gateway (SGW) in the visited network and Packet Data Network Gateway (PDN Gateway or PGW) in the home or visited network based on the type of session requested.

In the embodiment, the GTP entities are separated into a control plane and a user plane. In this way, a user plane of a given functional entity can be expanded or contracted by adding a new user plane functions or removing existing user plane functions, to accommodate changing traffic and/or bandwidth requirements. The SGW-1 control plane (CP) function (SGW-1 C) 102 can control multiple SGW UP functions, e.g., the SGW-1 user plane (UP) function (SGW-1 U) 107, the SGW-2 UP plane (SGW-2 U) 108 and the SGW-3 UP plane (SGW-3 U) 109.

Likewise, the PGW-1 CP function (PGW-1 C) can control multiple PGW UP functions, e.g., a PGW-1 UP function and a PGW-2 UP function.

The MME 101 manages the SGW-1 C 102. The eNode B-1 104 is connected to the PGW-1 U 110 via the SGW-1 U 107. The eNode B-2 105 is connected to the PGW-1 U 110 via the SGW-2 U 108. The eNode B-3 106 is connected to the PGW-2 U 112 via the SGW-3 U 109.

The above entities are connected to each other via standardized interfaces, which may also be referred to as network interfaces, or any other similar and/or suitable connection type.

Figure 1B:
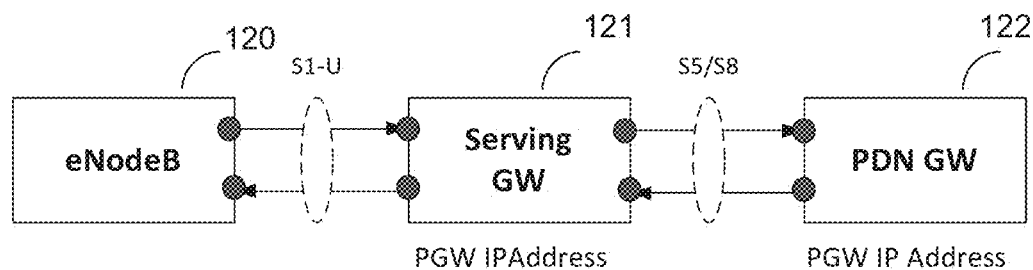

As illustrated in FIG. 1B, the eNodeB 120 and the serving gateway 121 are connected via an S1-U interface. Also, the serving gateway 121 is connected to the PDN gateway 122 via an S5/S8 interface.

In the embodiment, since one control plane entity can be responsible for interfacing with multiple user plane entities, it is desirable that the control entities of PGW (PGW-C) and SGW (SGW-C) assign IP address of their respective user plane entities. This includes assignment of IP address and Tunnel Endpoint Identifiers (TEIDs) allocations for GTP user plane and control plane of these GTP entities. This present disclosure provides solution for assignment of IP address in control or user plane and TEID allocation in user plane.

The allocation of TEIDs for the GTP user and control planes can be done by user plane entities since the scope of these TEIDs will be local. Information of IP addresses and TEIDs is then exchanged with their respective control plane entities.

For the purpose of illustration, only one eNodeB is illustrated. However, the present disclosure is not limited thereto, and there may be more than one eNodeB in the LTE system. Also, each eNodeB may be configured to support MTC devices and/or legacy devices.

There are two options provided for IP address assignment and TEID allocation of GTP entities (SGW and PGW) based on where IP address assignment is done (in control plane or user plane of GTP entities). In both cases, allocation of TEIDs can be done in the user plane of GTP entities.

Figure 2:
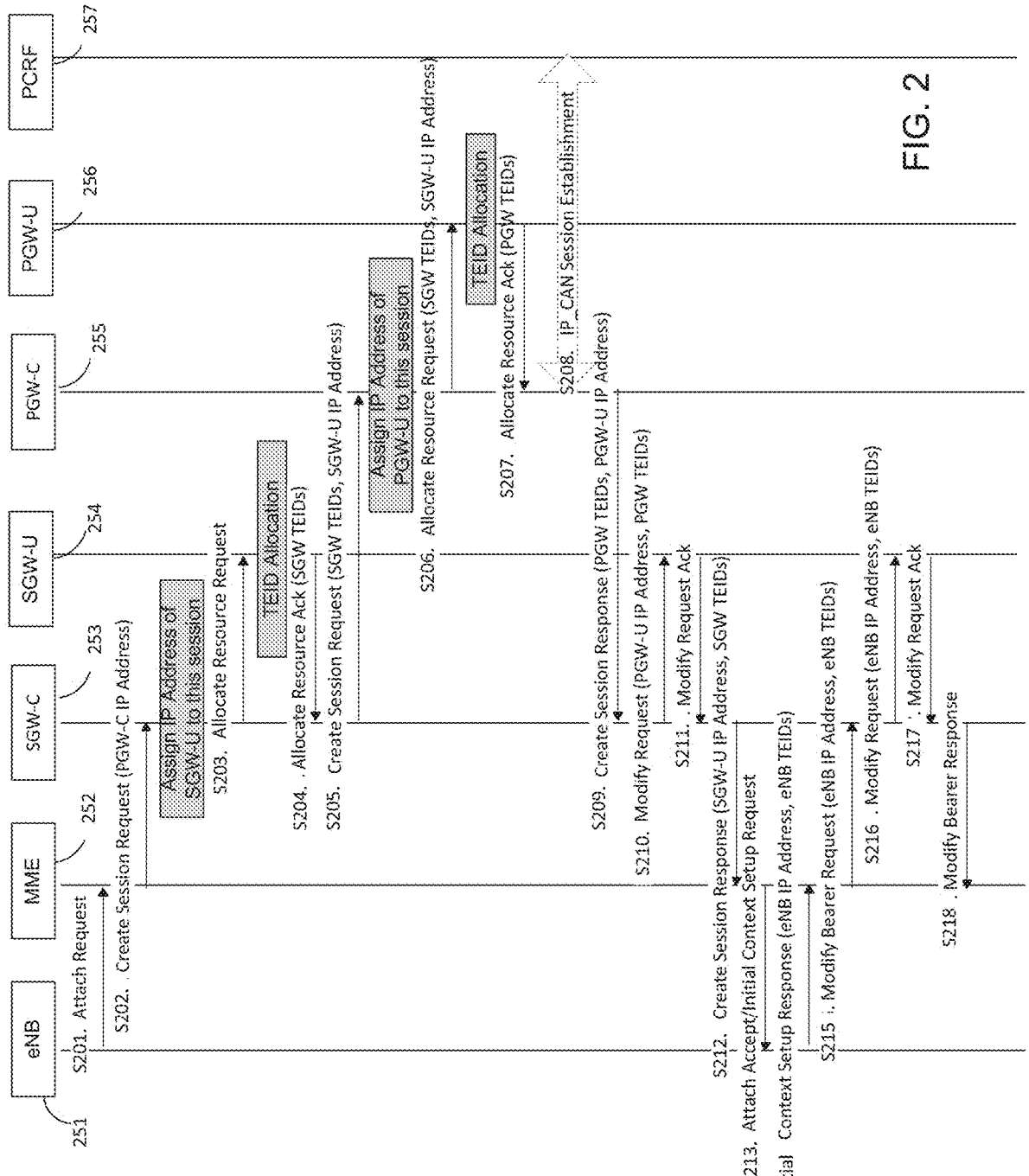
FIG. 2 illustrates a call flow for supporting IP address assignment in control plane and TEID allocation in user plane in the wireless cellular network in accordance with the present disclosure.

FIG. 2 illustrates a call flow for supporting IP address assignment in control plane and TEID allocation in user plane in the wireless cellular network in accordance with the present disclosure. The embodiment of the call flow shown in FIG. 2 is for illustration only. Other embodiments of the call flow could be used without departing from the scope of this disclosure.

In step S201, eNodeB 251 transmits a request for PDN connectivity to the MME 222 as a part of Attach procedure.

In step S202, the MME 222 requests Default Bearer creation by sending a Create Session Request along with the PGW-C IP Address to the serving gateway-control plane function (SGW-C) 253. The SGW-C 253 selects a serving gateway user plane function (SGW-U) among a plurality of SGW-Us based on criteria like e.g., a location of UE, an optimal path for user data transmission. The SGW-C 253 assigns an IP address from the designated pool of SGW-U address. In some embodiments, this IP address can also be obtained by other means in the operator's network, i.e. based on operator defined policy or based on provisioning. Once the IP address is assigned, SGW-C 253 requests serving gateway user plane function (SGW-U) 254 to allocate TEIDs by sending Allocate Resource Request message.

In step S203, upon receipt of resource allocation request from SGW-C 253, the SGW-U 254 allocates TEIDs from the local pool for GTP user plane and control plane toward PGW (SGW-U TEIDs for downlink transmission) and also toward eNB (SGW-U TEIDs for uplink transmission). The SGW-U 254 may also obtain this information based on network operator's policy.

In step S204, allocated TEIDs for uplink and downlink transmission are returned in the Allocate Resource Ack, to the SGW-C 253.

In step 205, the SGW-C 253 sends a Create Session Request including a SGW-U IP Address and SGW-U TEIDs for downlink transmission, to a PGW-C 255 along with the newly assigned IP address of the SGW-U 254 and TEIDs for GTP connectivity toward the PGW-U 256. The PGW-C 255 assigns an IP address to the designated pool of PGW-U address. This address can also be obtained by other means in the operator's network, i.e. based on operator defined policy or based on provisioning.

In step 206, once the IP address is assigned, PGW-C 255 requests PGW-U 256 to allocate TEIDs by sending Allocate Resource Request message including an SGW-U IP Address and SGW-U TEIDs for downlink transmission. Upon receipt of resource allocation request from PGW-C 255, the PGW-U 256 allocates TEIDs from the local pool. The PGW-U 256 can also obtain this information based on network operator's policy.

In step 207, the allocated PGW-U TEIDs are returned in the Allocate Resource Ack message to the PGW-C 255.

In step 208, upon receipt of the response from the PGW-U 256 along with newly assigned TEIDs, the PGW-C 255 may initiate Internet Protocol connectivity access network (IP CAN) Session Establishment/Modification procedure with the Policy and Charging Rule Function (PCRF).

In step 209, a response is sent to the SGW-C 253 along with the PGW-U TEIDs and also PGW-U IP address in a Create Session Response message including a PGW-U IP Address and a PGW-U TEIDs.

In step 210, the SGW-C 253 then forwards received PGW-U TEIDs and PGW-U IP address to SGW-U 254 by sending Modify Request message.

In step S211, the SGW-U 254 acknowledges the request.

In step S212, after receiving the response of the Modify Request, a Create Session Response message along with SGW-U IP Address and SGW-U TEIDs is sent to the MME 252.

In step S213, MME 252 then sends an Attach Accept message to the UE via eNB 251. The Initial Context Setup message piggybacking the Attach Accept message includes the SGW-U IP Addresses and SGW-U TEIDs. The Initial Context Setup message includes an SGW-U IP Address and an SGW-U TEIDs.

In step S214, the MME 252 receives an Initial Context Response message including an eNB IP Address and eNB TEIDs from the eNB 251.

In step S215, the MME sends the Modify Bearer Request message including an eNB IP Address and eNB TEIDs, to the SGW-C 253.

In step S216, the SGW-C 253 sends the Modify Request message including an eNB IP Address and eNB TEIDs, to the SGW-U 254.

In step S217, the SGW-U 254 acknowledges the Modify Request message by sending the Modify Request Ack message.

In step S218, the SGW-C 253 sends the Modify Bearer Response message to the MME 252.

Figure 3:
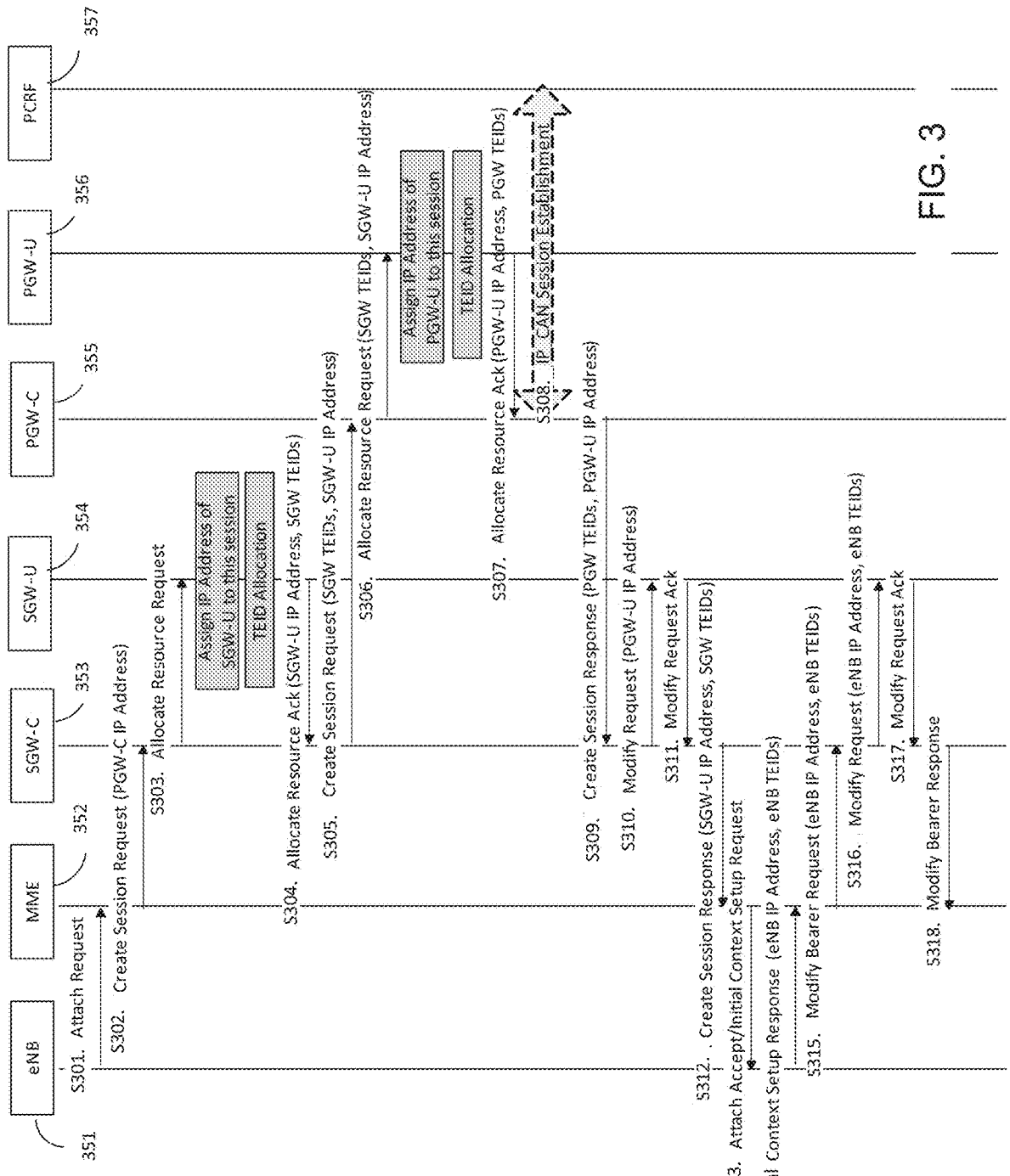
FIG. 3 illustrates a call flow for supporting IP address assignment in the user plane and TEID allocation in the user plane in accordance with the present disclosure.

FIG. 3 illustrates a call flow for supporting IP address assignment in user plane and TEID allocation in user plane in accordance with the present disclosure. The embodiment of the call flow shown in FIG. 3 is for illustration only. Other embodiments of the call flow could be used without departing from the scope of this disclosure.

In step S301, the eNB 351 transmits a PDN connectivity request to the MME 352 as a part of Attach procedure.

In step 302, the MME 352 requests for a Default Bearer creation by sending a Create Session Request (PGW-C IP Address) to the SGW-C 353. In the embodiments, the SGW-C 353 assigns a SGW-U 354 among a plurality of SGW-Us based on criteria like a location of UE or an optimal path for user data transmission and instructs SGW-U 354 to assign its IP address by sending the Allocate Resource Request message.

In step S303, upon a receipt of resource allocation request from SGW-C 353, the SGW-U assigns an IP address from the designated pool of SGW-U addresses. This IP address can also be obtained by other means in the operator's network, i.e. based on operator defined policy or based on provisioning. Once the IP address is assigned, the SGW-U allocates TEIDs from the local pool for GTP user plane and control plane toward PGW (SGW-U TEIDs for downlink transmission) and also toward eNB 351 (SGW-U TEIDs for uplink transmission). The SGW-U 354 may also obtain this information based on network operator's policy.

In step S304, allocated TEIDs and assigned IP address are returned in the Allocate Resource Ack message including SGW-U TEIDs for downlink transmission and SGW-U TEIDs for uplink transmission, to the SGW-C 353.

In step S305, the SGW-C 353 sends a Create Session Request including an SGW-U IP Address and an SGW-U TEID for downlink transmission, to the PGW-C 355 along with the newly assigned IP address of the SGW-U 354 and TEIDs for GTP connectivity toward the PGW-U 356.

In step S306, upon a receipt of the Create Session Request from the SGW-C 353, the PGW-C 355 selects an appropriate PGW-U among a plurality of PGW-Us based on a user location, a user profile, an optimal routing choice, and the like. Once the PGW-U 356 is selected among a plurality of PGW-Us, the PGW-C 355 sends an Allocate Resource Request message including an SGW-U IP Address and an SGW-U TEID for downlink transmission, to the PGW-U 356. Upon receipt of resource allocation request from the PGW-C 355, the PGW-U 356 assigns an IP address from the designated pool of PGW-U addresses. This address can also be obtained by other means in the operator's network, i.e., based on operator defined policy or based on provisioning. The PGW-U 356 then allocates TEIDs from the local pool. The PGW-U 356 can also obtain this information based on network operator's policy.

In step S307, allocated TEIDs and PGW-U IP address are returned in the Allocate Resource Ack message including PGW-U TEIDs to the PGW-C 355.

In step S308, upon a receipt of the response from the PGW-U 356 along with newly assigned TEIDs, the PGW-C 355 may initiate an IP CAN Session Establishment/Modification procedure with the PCRF.

In step S309, a response is sent to SGW-C 353 along with the PGW-U TEIDs for user plane and control plane and also PGW-U IP address in a Create Session Response message including a PGW-U IP Address and PGW-U TEIDs.

In step S310, the SGW-C 355 then forwards received PGW TEIDs and PGW-U IP address to SGW-U 356 by sending a Modify Request message including a PGW-U IP Address and PGW-U TEIDs.

In step S311, the SGW-U 356 acknowledges the Modify Request message.

In step S312, after receiving the response of the Modify Request, a Create Session Response message including an SGW-U IP Address and SGW-U TEIDs, is sent to the MME 352.

In step S313, the MME 352 then sends Attach Accept message to the UE via the eNB 351. The Initial Context Setup message piggybacking the Attach Accept message includes the SGW-U IP Addresses and SGW-U TEIDs. The Initial Context Setup message can include an SGW-U IP Address and SGW-U TEIDs.

In step S314, the MME 352 receives an Initial Context Response message including an eNB IP Address and eNB TEIDs, from the eNB 351.

In step S315, the MME 352 sends the Modify Bearer Request message including an eNB IP Address and eNB TEIDs, to the SGW-C 353.

In step S316, the SGW-C 353 sends the Modify Request message including an eNB IP Address and eNB TEIDs, to the SGW-U 354.

In step S317, the SGW-U 354 acknowledges the Modify Request message by sending the Modify Request Ack message.

In step S318, the SGW-C sends the Modify Bearer Response message to the MME.

Figure 4:
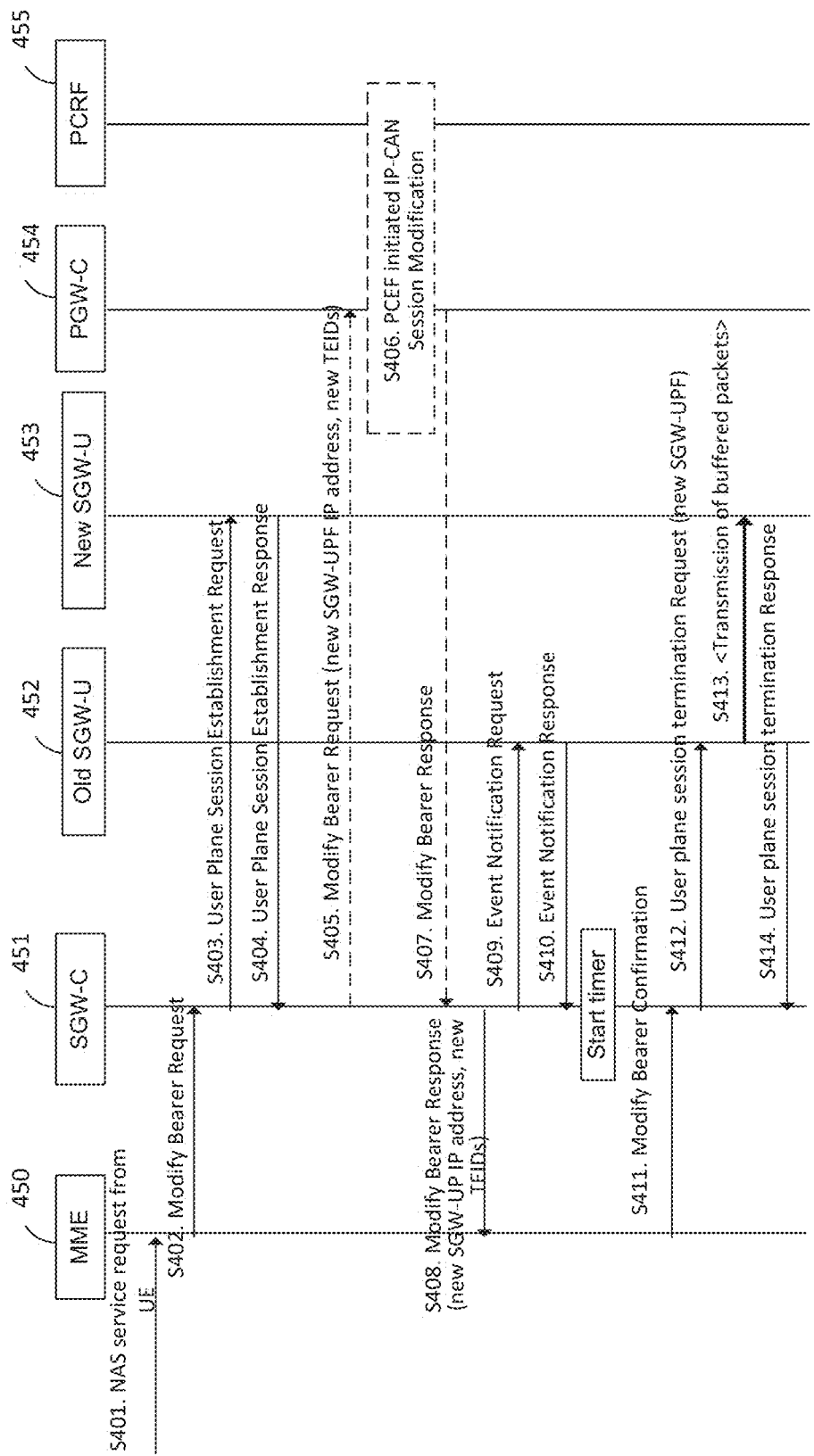
FIG. 4 illustrates an example SGW user plane change triggered by the Service Request procedure in the cellular network in accordance with the present disclosure.

FIG. 4 illustrates an example SGW user plane change triggered by the Service Request procedure in the cellular network in accordance with the present disclosure. The embodiment of the SGW user plane change in the cellular network shown in FIG. 4 is for illustration only. Other embodiments of the SGW user plane change could be used without departing from the scope of this disclosure.

This present disclosure provides an optimized procedure to handle change of the SGW U resulted due to the mobility event. In the embodiments, the trigger can be provided by the MME to have modification of the connection. The existing messages between the MME and CFs of SGW and PGW are updated to include GTP-U bearer management information. The new message is also introduced from the MME to the SGW-C confirming the completion of the GTP-U update in the access network. The explicit buffer management is introduced so that there may not be any loss of buffers in downlink or uplink directions.

TR 23.714 introduces many new messages between existing entities and also over the Sx interface, i.e. between the control plane function and user plane function of the gateways. 3GPP Technical report (TR) 23.714 is hereby incorporated by reference in its entirety. Instead of that, this present disclosure provides optimized solution by piggybacking information in the existing messages. It also offers buffering mechanism so that uplink and downlink messages are not lost while SGW-U is changed. This will offer low latency and less implementation complexity without compromising the functionality.

In this present disclosure, the Service Request procedure is modified to provide new GTP-U address and TEIDs to the MME during the Service Request procedure. This information is piggybacked with the existing messages between the control plane function and user plane function. In addition to this, one new message is defined from the MME to the SGW control plane function. Messaging for request for buffering packets and release of buffered packets have also been added.

In step 401, MME 450 receives a Non-Access Stratum (NAS) service request from a UE.

Upto the step S402, the embodiments have a procedure similar to "UE triggered Service Request" procedure defined in the section 5.3.4.1 of 3GPP TS 23.401 specifications, which are incorporated by reference. The following steps discuss additional updates/messaging included resulted due to separation of gateway functionality in control plane function and user plane function.

In step S403, upon a receipt of a Modify Bearer Request from MME 450, SGW-C 451 determines to change its SGW-U. SGW-C 451 selects new SGW-U 453 among a plurality of SGW-Us, based on, e.g., a user location, a user profile, or an optimal routing choice, and sends a User Plane Session Establishment Request to the new SGW-U 453 requesting it to allocate resources. In one embodiment, the IP address and the TEIDs of new SGW-U are assigned by the SGW-C 451. In another embodiment, the IP address and the TEIDs of new SGW-U are assigned by the new SGW-U 453. In yet another embodiment, the IP address of new SGW-U is assigned by the SGW-C and the TEID of a new SGW-U is assigned by the new SGW-U 453. In yet another embodiment, the SGW-C 451 assigns the TEIDs of the new SGW-U, and the new SGW-U 453 assigns the TEIDs of the new SGW-U.

In step S404, depending on where TEIDs are allocated and an IP address of new SGW-U 453 is assigned, the new SGW-U 453 returns information to the SGW-C 451 in a User Plane Session Establishment Response message.

In step S405, the SGW-C 451 sends a Modify Bearer Request to the PGW-C 454 along with new SGW-U identity and TEIDs of the new SGW-U.

In step S406, the Policy and Charging Enforcement Function (PCEF) 454, i.e., PGW-C may initiate an IP-CAN session Modification with the PCRF.

In step S407, the PCEF 454 sends a Modification Bearer Response to SGW-C 451.

In step S408, the SGW-C 451 sends a Modification Bearer Response including the new SGW-U IP address and new TEIDs.

In steps S409-S410, an Event Notification procedure is used by the SGW-C 451 to request the old SGW-U 452 to start buffering packets. The SGW-C 451 then starts a timer ($T_{UpdateConf}$) monitoring the confirmation of a Modify Bearer Response from the MME 450.

In step S411, a Modify Bearer Confirmation is received from the MME 450. The SGW-C 451 stops a timer monitoring the confirmation of a Modify Bearer Response from the MME 450.

In step S412, once the Modify Bearer Confirmation is received or the timer expires, the SGW-C 451 initiates a User Plane Session Termination request toward the old SGW-U 452. This message includes the identity of the new SGW-U 451.

In step S413, upon receipt of the User Plane Session Termination request, the old SGW-U 452 releases buffered packets toward the new SGW-U 453.

In step S414, the old SGW-U 452 terminates all resources and responds with a User Plane Session Termination response to the SGW-C 451.

Figure 5:
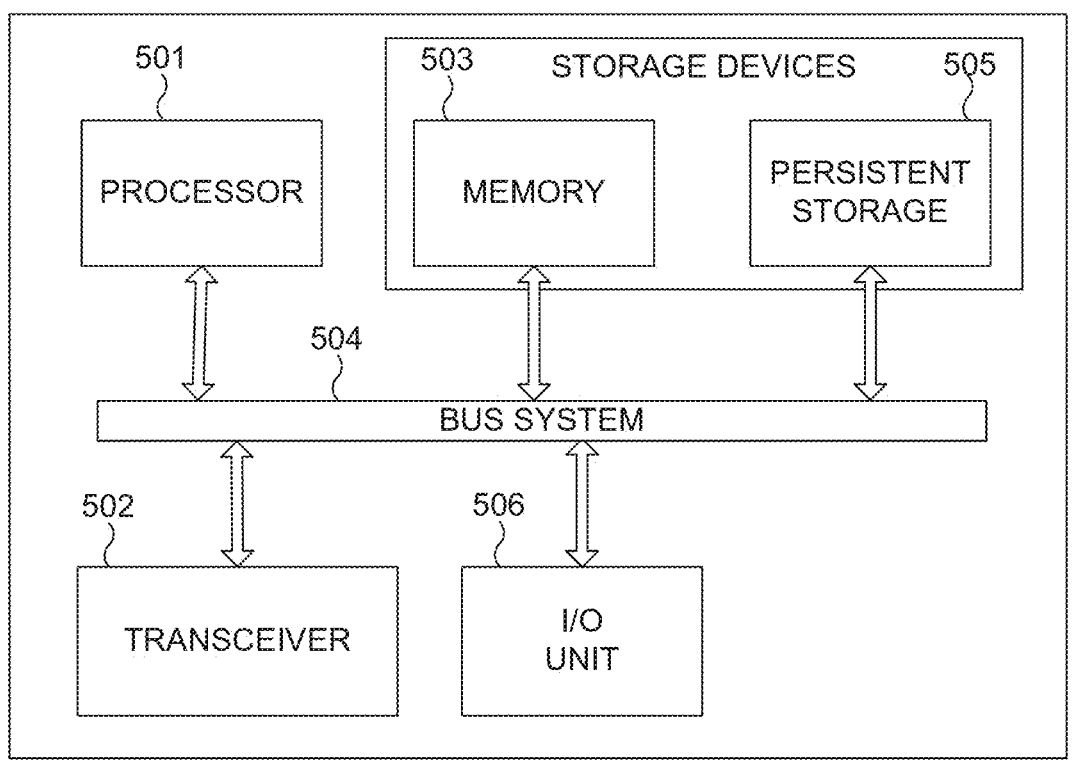
FIG. 5 illustrates a block diagram showing various components for implementing the server/gateway entities in the cellular network in accordance with the present disclosure.

FIG. 5 illustrates a block diagram showing various components for implementing the server/gateway entities in the cellular network in accordance with the present disclosure. The server/gateway entities may include an eNB (251 or 351), an MME (252, 352 or 450), an SGW-C (253, 353 or 451), SGW-U (254, 354 or 452), a PGW-C (255, 355 or 453), PGW-U (256, 356 or 454) and a PCRF (257, 357 or 455). The embodiment of the server/gateway entities in FIG. 5 is for illustration only. Other embodiments of the SGW user plane change could be used without departing from the scope of this disclosure.

Referring to FIG. 5, the server/gateway entities includes a processor 501, a memory 503, a Read Only Memory (ROM) 505, a transceiver 502, and a bus 504. The processor 501, according to the present exemplary embodiment, may be any type of physical computational circuit or hardware, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, an integrated circuit, an application specific integrated circuit, or any other type of similar and/or suitable processing circuit. The processor 501 may also include embedded controllers, such as generic or programmable logic devices or arrays, application specific integrated circuits, single-chip computers, smart cards, and the like.

The transceiver 502 supports communications with other systems or with other entities in a cellular network. For example, the transceiver 502 could include a network interface card or a wire/wireless transceiver facilitating communications over the network. The communications unit 502 may support communications through any suitable physical or communication link(s).

The memory 503 may be volatile memory and non-volatile memory. A variety of computer-readable storage media may be stored in and accessed from memory elements of the memory 503. The memory elements may include any number of suitable memory devices for storing data and machine-readable instructions, such as a ROM, a Random Access Memory (RAM), an Erasable Programmable Read Only Memory (EPROM), an Electrically EPROM (EEPROM), a hard drive, a removable media drive for handling memory cards, memory sticks, and any other similar and/or suitable type of memory storage device and/or storage media.

The persistent storage 505 may contain one or more components or devices supporting longer-term storage of data, such as a ready only memory, hard drive, Flash memory, or optical disc.

The I/O unit 506 allows for input and output of data. For example, the I/O unit 506 may provide a connection for user input through a keyboard, mouse, keypad, touchscreen, or other suitable input device. The I/O unit 506 may also send output to a display, printer, or other suitable output device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Mobility Management Entity (MME) in a wireless communication system, the MME comprising:
   a transceiver; and
   a controller configured to:
      cause the transceiver to transmit, to a serving-gateway control-plane function (SGW-C), a modify bearer request message including an address and tunnel endpoint identifiers (TEIDs) of an evolved Node B (eNodeB);
      cause the transceiver to receive, from the SGW-C in response to the modify bearer request message received by the SGW-C from the MME, a modify bearer response message including an address and TEIDs of a new SGW-U; and
      cause the transceiver to transmit, to the SGW-C, a confirmation message to acknowledge the receipt of the modify bearer response message from the SGW-C.

2. The MME of claim 1, wherein the address and TEIDs of the new SGW-U are allocated by the new SGW-U.

3. The MME of claim 1, wherein the controller is further configured to:
   cause the transceiver to receive, from a user equipment, a non-access stratum service request; and
   cause the transceiver to transmit the modify bearer request message to the SGW-C upon receipt of the non-access stratum service request.

4. The MME of claim 1, wherein:
   once the confirmation message is received by the SGW-C, a user plane session termination request is initiated toward an old SGW-U; and
   buffered packets are released by the old SGW-U toward the new SGW-U.

5. The MME of claim 1, wherein:
   a timer is started by the SGW-C to monitor whether to receive the confirmation message from the MME;

based on the timer expiring without receiving the confirmation message, a user plane session termination request is initiated toward an old SGW-U; and
buffered packets are released by the old SGW-U toward the new SGW-U.

6. A method of a serving gateway-control plane function (SGW-C) in a wireless communication system, the method comprising:
receiving, from a Mobility Management Entity (MME), a first modify bearer request message;
selecting a serving gateway-user plane function (SGW-U) based on a location of a terminal;
transmitting, to the selected SGW-U, a request message for the selected SGW-U to allocate tunnel endpoint identifiers (TEIDs);
receiving, from the selected SGW-U, a response message including the TEIDs, wherein the TEIDs are allocated by the selected SGW-U;
transmitting, to the MME in response to the first modify bearer request message, a modify bearer response message including an address and the TEIDs allocated by the selected SGW-U; and
starting a timer for confirmation of the modify bearer response message from the MME.

7. The method of claim 6, further comprising:
transmitting, to a packet-data-network gateway-control plane function (PGW-C), a second modify bearer request message including the TEIDs allocated by the selected SGW-U.

8. The method of claim 6, wherein:
the first modify bearer request message includes an IP address and TEIDs of an eNodeB.

9. The method of claim 6, further comprising:
monitoring whether to receive a modify bearer confirmation message for confirmation of the modify bearer response message from the MME.

10. The method of claim 6, further comprising:
once a modify bearer confirmation message is received, initiating a user plane session termination request toward an old SGW-U that releases buffered packets toward the selected SGW-U.

11. A serving gateway-control plane function (SGW-C) comprising:
a transceiver; and
a controller configured to:
cause the transceiver to receive a first modify bearer request message from a Mobility Management Entity (MME);
select a serving gateway-user plane function (SGW-U) based on a location of a user equipment (UE);
cause the transceiver to transmit, to the selected SGW-U, a request message for the selected SGW-U to allocate tunnel endpoint identifiers (TEIDs);
cause the transceiver to receive, from the selected SGW-U, a response message including the TEIDs, wherein the TEIDs are allocated by the selected SGW-U;
cause the transceiver to transmit, to the MME in response to the first modify bearer request message, a modify bearer response message including an address and the TEIDs allocated by the selected SGW-U; and
start a timer for confirmation of the modify bearer response message from the MME.

12. The SGW-C of claim 11, wherein the controller is further configured to:
cause the transceiver to transmit, to a packet-data-network gateway-control plane function (PGW-C), a second modify bearer request message including the TEIDs allocated by the selected SGW-U.

13. The SGW-C of claim 11, wherein the first modify bearer request message includes an IP address and TEIDs of an eNodeB.

14. The SGW-C of claim 11, wherein the controller is further configured to:
monitor whether to receive a modify bearer confirmation message for confirmation of the modify bearer response message from the MME.

15. The SGW-C of claim 14, wherein the controller is further configured to:
based on the timer expiring without receiving the modify bearer confirmation message, cause the transceiver to initiate a user plane session termination request toward an old SGW-U; and
request the old SGW-U to release buffered packets toward the selected SGW-U.

* * * * *